Aug. 16, 1966  H. N. CHRISTENSEN  3,266,793
PORTABLE VISE
Filed Sept. 23, 1963

INVENTOR:
HARRY N. CHRISTENSEN
BY: *James E. Nilles*
ATTORNEY

United States Patent Office 3,266,793
Patented August 16, 1966

3,266,793
PORTABLE VISE
Harry N. Christensen, Racine, Wis., assignor to George Gorton Machine Co., Racine, Wis., a corporation of Wisconsin
Filed Sept. 23, 1963, Ser. No. 310,557
10 Claims. (Cl. 269—240)

My invention relates to a portable vise or clamping fixture, particularly adapted to holding small parts for machine operations. My vise may also be conveniently used to hold parts for performing hand operations thereon.

Prior vises or work holders are not sufficiently facile or accurate in their clamping and positioning functions. As a result, intricate or irregularly shaped parts must often be tediously located and gauged for each set-up. Parts subjected to a sequence of machine operations often require a multiplicity of clamps, vises and fixtures to hold them in various aspects suitable to the different operations. I find that frequently more time is spent in setting up, gauging and locating small parts than in performing the machine operations. Even with the greatest care, spoilage often results from inaccuracy in positioning. While mass-production usually warrants special jigs and fixtures, such expedients are not usually economical in small lot manufacture, or tool and die work.

A principal object of my invention is to facilitate clamping and positioning of a wide variety of small parts for machine operations.

Another object of my invention is to provide a simple, inexpensive, yet versatile, vise which can be quickly and accurately positioned in any of several positions on a machine table, bench or other workholder.

Still another object is to provide in a compact vise a variety of clamping surfaces or agencies whereby readily to accommodate parts of different shapes, sizes and machining aspects.

A further object of my invention is to provide a vise which facilitates precision machine work by accurately locating a part in a predetermined position to a tool, the location being established from accessible, precision reference surfaces of the vise itself.

Other objects and advantages of my invention will be apparent from the following description and the accompanying drawings, in which.

Figure 1:
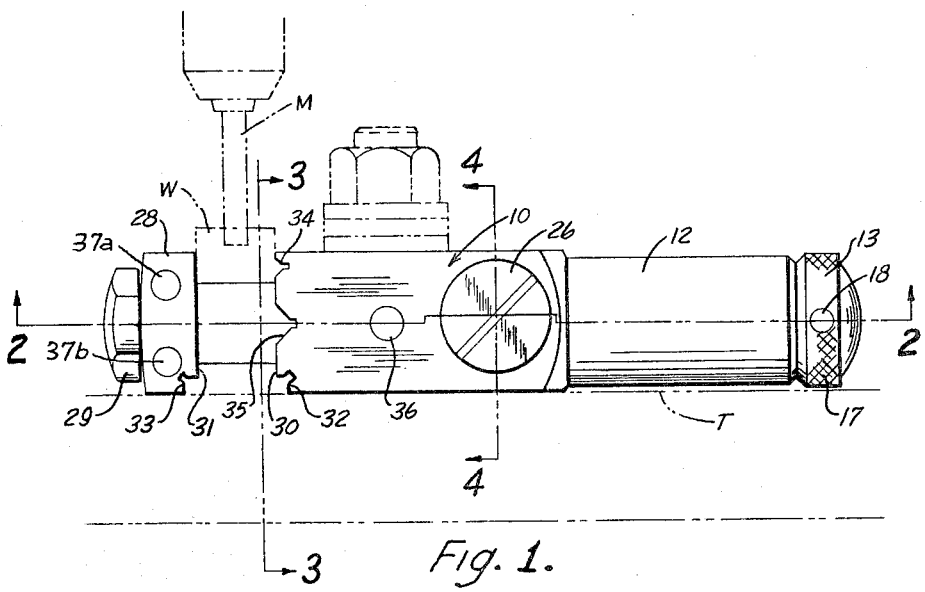
FIG. 1 is an elevation showing the vise in one selected position on a machine table, machine parts, tool and a workpiece being shown in broken lines, by way of example.
Figure 3:
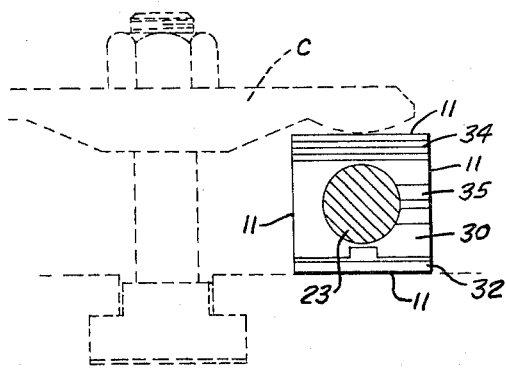
FIG. 3 is a transverse section on line 3—3 of FIG. 1.

Referring now to FIGS. 1 and 3, reference numeral 10 indicates the body of my vise. The exterior of body 10 is square for about half its length, as best seen in FIG. 3. The side faces are indicated by numerals 11. Faces 11 are precision squared and polished to provide accurate reference and support faces. Any of faces 11 can be thus held against a machine table or other like support or locating surface, with assurance that the other faces 11 are square or parallel to the locating surface, as the case may be.

Figure 2:
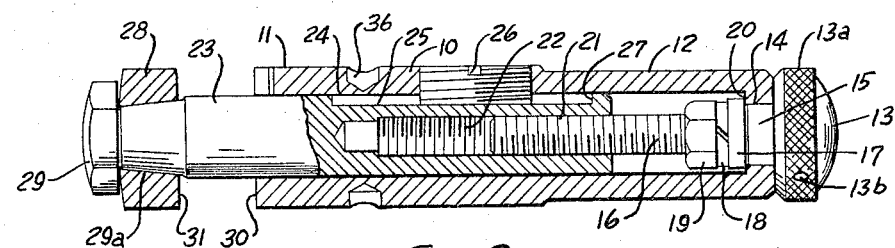
FIG. 2 is a longitudinal section on line 2—2 of FIG. 1.

For the remainder of its length, body 10 is provided with a barrel portion 12, preferably of smaller diameter than the distance between parallel faces 11, for clearance purposes. An elongated thumb screw 13 has a neck 15 revolvably fitted into bore 14 at the end of barrel 12, as seen in FIG. 2. Under neck 15, screw 13 extends in a threaded stem 16. Axial movement of stem 16 relative to barrel 12 is prevented by a stop assembly consisting of thrust washer 17, lock washer 18 and nut 19, the length of neck 15 being such that washer 17 is held closely opposed to shoulder 20 at the juncture of bores 14 and 24 when the screw head rides on the end of barrel 12.

Figure 4:
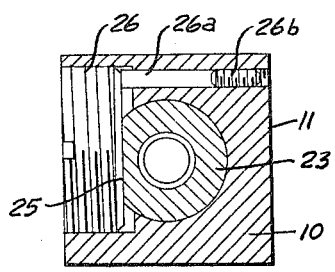
FIG. 4 is a transverse section on line 4—4 of FIG. 1, showing a detail.

The head of screw 13 provides an enlargement which may be knurled for finger grip, as at 13a, and may also be socketed for a spanner wrench, as at 13b. Obviously, any suitable head form may be used, the one shown being a preferred form. The inner end of stem 16 is threaded as indicated at 21, to engage tap 22 of rod 23. Rod 23 is a close sliding fit in bore 24 of body 10, bore 24 being coaxial with bore 14. Thus, turning screw 13 will cause rod 23 to slide in body 10, provided rod 23 is held against rotation. To prevent rod 23 from turning relative to body 10, rod 23 has a flat portion 25, and a large, flat screw 26 is fitted to body 10, in position to bear on flat 25. Screw 26 is turned only so far as to bear snugly on rod 23, but without seizing or binding. The parts are preferably lubricated to facilitate the close sliding fits desired. As seen in FIG. 2, the outer face of screw 26 is flush or slightly below side 11, when screw 26 bears on flat 25. Thus, screw 26 does not interfere with use of side 11 as a locating surface. Also, to serve as a variable limit to the inward travel of screw 26, I provide an adjustable stop pin, as best seen in FIG. 4. Pin 26a bears against set-screw 26b, opposite the outer edge of screw 26. By turning set screw 26b, pin 26a may be so positioned that it will stop inward travel of screw 26 at just such position that the rod 23 may slide freely, but without rotative play.

The length of flat portion 25 is equal to the desired travel of rod 23 plus the diameter of screw 26. Outward travel of rod 23 is limited by shoulder stop 27 striking screw 26, so that the rod 23 will not be accidentally disengaged from stem 16, should screw 13 be turned too far in the projecting direction. However, rod 23 may be removed or inserted by backing off screw 26. The relative positions of screw 26 and shoulder stop 27 are such that there is adequate thread engagement between stem 16 and rod 23, when the latter is at its extreme outward travel relative to body 10.

At its outer end, rod 23 is fitted with a square jaw 28, so finished and positioned that its outer faces are planar projections of body faces 11. This relationship of the faces is best achieved by assembling the roughly finished parts, then precision finishing the jaw and body faces in the same final operations. The jaw 28 may be held in position on rod 23 by a nut 29, or in any other suitable manner. Orientation is maintained by locking jaw 28 to rod 23, for example by mating lock taper 29a, or by a dowel, key or the like, whereby the exterior faces of body 10 and jaw 28 remain coplanar, as rod 23 is rotarily restrained by screw 26.

The opposed faces 30 and 31 of body 10 and jaw 28 respectively serve to clamp a workpiece such as W, when nut 13 is turned to draw jaw 28 toward body 10. However, to accommodate parts which are difficult to grip with plane jaws, for example, very small parts, rods, discs, or irregular shaped pieces, I prefer to provide a plurality of grooves or notches along faces 30 and 31. Notches 32 and 33 are particularly adapted to clamping therebetween strips, thin plates or the like, which require lateral support to prevent buckling or shifting under inward tool pressure. V-groove 34 particularly accommodates small diameter or other slender parts which present small radii clamping surfaces. V-groove 35 is particularly adapted to clamping short rods, discs or the like.

While notches, grooves or the like are well-known expedients in the workholding art, it will be apparent from the representative arrangement illustrated and described that certain unique advantages derive from the novel construction of my vise. Each of the clamping surfaces, grooves or notches is truly square or parallel to the locating surfaces 11. Therefore the principal axes of any part clamped between jaw 28 and body 10 will be oriented square or parallel to surfaces 11. If then the vise is placed upon a machine table, surface plate or the like, in turn square or parallel to a tool axis, it will not be necessary to tap, shim, shift, adjust, gauge or otherwise manipulate the vise or part to secure the desired initial orientation of the part and tool.

FIGURES 1 and 3 illustrate the use of my vise, by way of example. The work W is clamped between faces 30 and 31, in the manner previously described. Two major axes of the work are thereby squared with faces 11. If the particular operation to be performed necessitates precisely squaring or leveling the third major axis, this is readily done by measuring from reference points on the work W to any face 11, using scale, caliper, depth gauge or indicator, and setting work W in the vise accordingly, as will be readily understood by those skilled in machine work. Alternatively, the vise may be placed on the machine table T and the table used as a reference plane. The vise may be held on table T by means of the usual clamps, such as that indicated generally at C, or in any other suitable manner, as well-known in the machine tool arts. It will be readily apparent that if further operations are required on any of the exposed portions of workpiece W, wherefor it may be necessary to reorient the piece on table T, shift to another machine or workplace, or for any other reason disturb the set-up, it is only necessary to demount the vise, while leaving workpiece W clamped therein, and reset the vise on the desired position, machine or workplace, with the assurance that only a single, simple measurement or reference need be made to insure desired correlation between prior and subsequent operations. It will also be readily apparent that, to the extent the workpiece itself does not interfere, the vise may be turned to rest on any of its other faces 11, to permit easier access to a particular surface of workpiece W for subsequent operations, while maintaining the basic reference position of the workpiece W.

FIGS. 1–3 illustrate further advantages of my vise. While workpiece W is held along clamping surfaces which are exteriorly accessible from all directions, in position of fullest possible tool access to the workpiece, the clamping surfaces are close to the axis of rod 23. These favorable conditions prevail with workpieces in any of the clamping aspects afforded. Thus bending stresses are minimized. An adequate, evenly distributed clamping force can be applied to a workpiece in any location or aspect without unduly stressing the part or the vise. The vise is rigid without being massive. The facility of evenly distributing clamping forces and the precision holding characteristics heretofore described combine to enhance the utility of the vise for precision work on delicate parts, as workpieces need not be subjected to crushing, marring or other deformative clamping stress.

While my vise as above described is capable of holding a wide variety of parts having different shapes and sizes, I have further increased the facility of use by special provision for certain types of irregular workpieces, such as patterns or templates, for example. For this purpose I provide pin locating holes, such as a series of holes 36 in the body 10 and one or more pairs of holes in the movable jaw, such as 37a and 37b. If it is desired to perform work such as milling the face of an irregular piece, locating and holding pins may be drive-fitted into holes 37a, 37b and one of series 36, in the positions indicated in FIGURE 1. The pins (not shown) then provide a three-point hold, with which virtually any irregular or curvilinearly contoured piece can be satisfactorily clamped.

In the cases of other irregular workpieces, such as ones with angular offsets or projections, clamping may best be achieved by cooperation of body face 30 and pins in holes 37a, 37b; or between jaw face 31 and a pin in one of holes 36. Similar clamping arrangements for odd parts are readily accomplished by utilizing one of the notches or grooves previously described and one or more pins in the opposed jaw. In any case, by virtue of the several pin sockets being squarely and accurately located relative to body faces 11 and the jaw 28, true positioning of parts is assured with any of the clamping arrangements described.

While I have described preferred embodiments and uses of my invention, it will be understood that the description is by way of illustration only. Adaptations of form and construction may be made without departing from the spirit of the invention as defined in the appended claims.

Having thus described and illustrated my invention, I claim the following:

1. A workholder comprising: an elongated body member having a precision square exterior for a substantial portion of its axial extent and a concentric barrel portion whose diameter is less than the height of said square exterior; a first bore in said body member concentric with said square and said barrel; a generally circular rod closely, but slidably, fitted in said bore and projecting therefrom at the end of the square exterior end of said body member; an elongated flat portion segmenting a portion of the exterior of said rod within said bore; a screw threaded through a side of said body member at right angles to the body axis in position to engage said flat portion, said screw being of larger diameter than the diameter of said rod, and said screw having a flat head and a flat end; an adjustable stop pin in said body member for limiting travel of said screw toward said flat portion, said pin engaging said screw near the rim thereof, spaced from said rod, said pin being adjustable to stop said screw in a position at which the flat end of said screw bears closely, but slidably, on said flat portion of said rod; a jaw secured to the projecting portion of said rod in predetermined polar orientation relative to said flat portion, the sides of said jaw forming a square of the same size as the square of said body member, the assembled relation being such that, with said screw bearing on said flat portion, the sides of said jaw are coplanar with the square sides of said body member; a second bore in said body member concentric with said first bore, said second bore being at the barrel end of said body member remote from said jaw, said second bore communicating with said first bore, a shoulder at the juncture of said bores; a stop assembly in said first bore and bearing on said shoulder; and a stem secured to said stop assembly and concentrically extending through said second bore into said first bore for threaded engagement with said rod, said stem having an enlargement bearing on the exterior of said body member, whereby turning of said stem causes axial movement of said jaw relative to said body member.

2. A workholder according to claim 1, wherein at least one of the opposing end faces of said jaw and said body member is notched for receiving and clamping a workpiece in predetermined position relative to said square exterior of said body member.

3. A workholder according to claim 1, wherein said stop pin is interposed between said screw and a set-screw threaded to said body member opposite to said screw.

4. A workholder according to claim 1, wherein said stop pin is interposed between said screw and a set-screw threaded to said body member opposite to said screw, the dimensions and arrangements of the parts being such that, with said screw bearing on said flat portion and said stop pin, said screw and said set-screw lie completely within said square exterior of said body member.

5. A workholder according to claim 1, wherein opposing end faces of said body member and said jaw are correspondingly notched for cooperatively receiving and clamping a workpiece in predetermined polarity relative to said square exterior of said body member.

6. A workholder according to claim 1, including pluralities of pin sockets in both said jaw and said body member, whereby said workholder is actuatable to clamp irregular workpieces against pins in one or more selected sockets.

7. A workholder according to claim 1, wherein a terminus of said flat portion constitutes a shoulder inward of said screw, limiting outward travel of said rod relative to said first bore.

8. A workholder according to claim 1, wherein said rod is secured to said jaw substantially centrally thereof by means preventing subsequent unintentional movement of said jaw relative to said rod.

9. A workholder according to claim 1, wherein said rod is secured to said jaw only at the central portion thereof, whereby to provide unobstructed access to clamping portions of said jaw throughout the periphery of said jaw.

10. A portable vise comprising an elongated body member having at least one planar exterior surface of substantial extent and a longitudinal bore therein, a first workpiece clamping and orienting face at one end of said body member transverse to said exterior surfaces, a jaw movably associated with said body member; a second workpiece clamping and orienting face on said jaw, opposed to said first face; a rod of generally circular cross section secured to said jaw and slideably in said bore and having a flat exterior portion, means adapted to move said jaw toward said body member to clamp a workpiece between said first and second faces; a flat-end screw threaded to said body member for sliding engagement on said flat exterior portion of said rod to restrain rotation of said rod relative to said body member, to thereby maintain the polar orientation of said second face to said first face and to said exterior surface, and an adjustable stop carried by said body to limit travel of said screw toward said flat exterior portion of said rod.

References Cited by the Examiner

UNITED STATES PATENTS

| 760,411 | 5/1904 | Arnold | 269—270 X |
| 1,019,721 | 3/1912 | Munson | 74—18.2 X |
| 1,397,409 | 11/1921 | Duwelius | 269—268 X |
| 1,756,185 | 4/1930 | Falck | 269—240 X |

FOREIGN PATENTS

| 800,950 | 9/1958 | Great Britain. |
| 903,737 | 8/1962 | Great Britain. |

ROBERT C. RIORDON, *Primary Examiner.*

R. J. BUENZLE, B. S. MOWRY, *Assistant Examiners.*